(No Model.) 3 Sheets—Sheet 1.
P. L. SYLVESTER.
COIN CONTROLLED DISPLAY APPARATUS.

No. 539,655. Patented May 21, 1895.

Witnesses:
Jas. E. Hutchinson
Henry C. Hazard

Inventor.
Philip L. Sylvester
by Prindle and Russell
his Attorneys

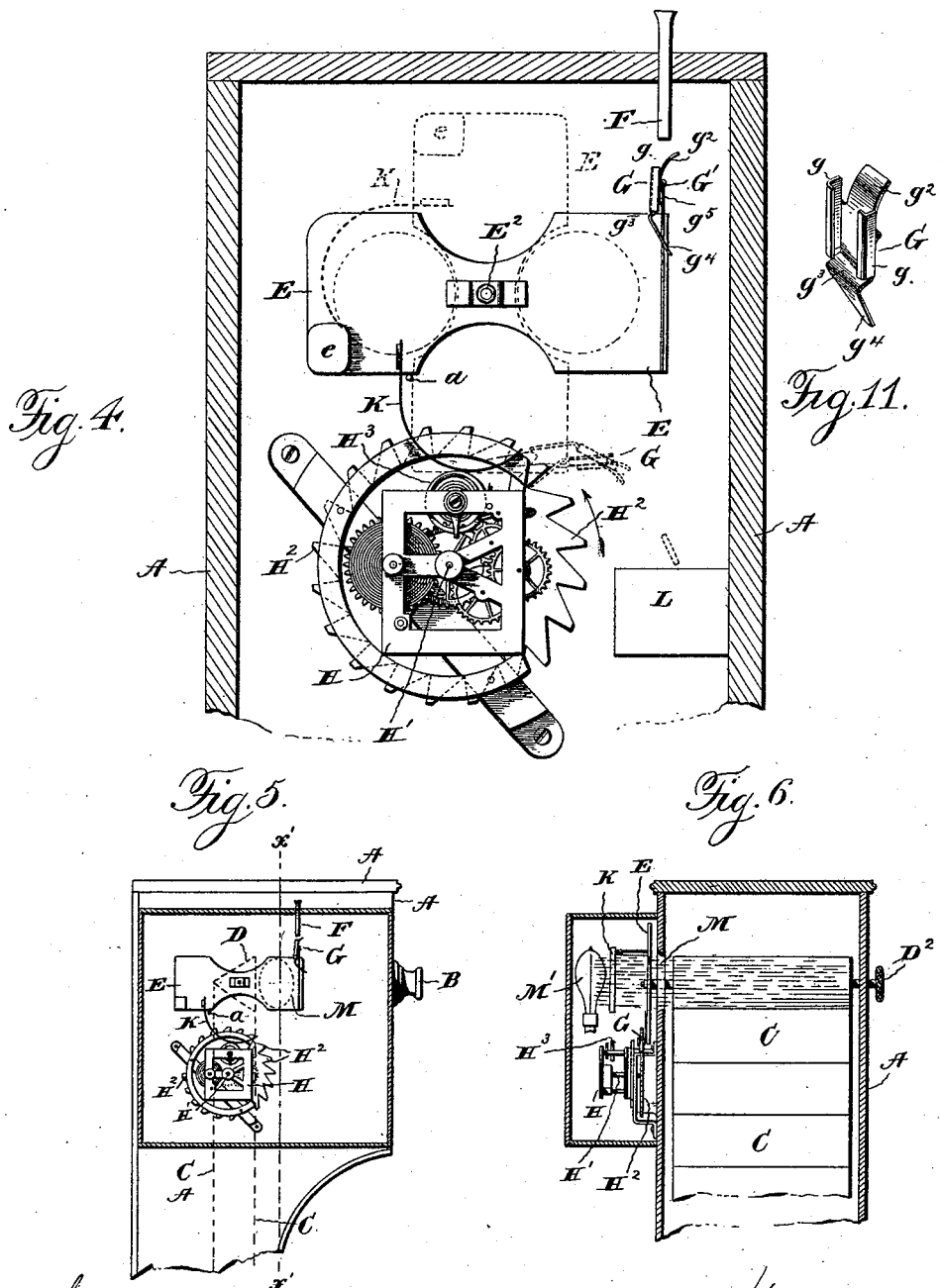

(No Model.) 3 Sheets—Sheet 3.
P. L. SYLVESTER.
COIN CONTROLLED DISPLAY APPARATUS.
No. 539,655. Patented May 21, 1895.
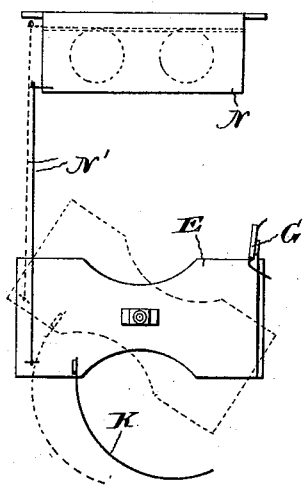
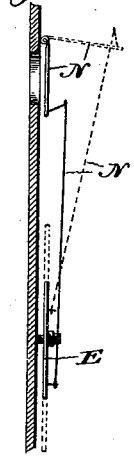
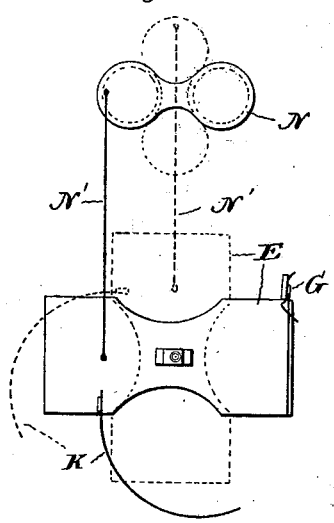
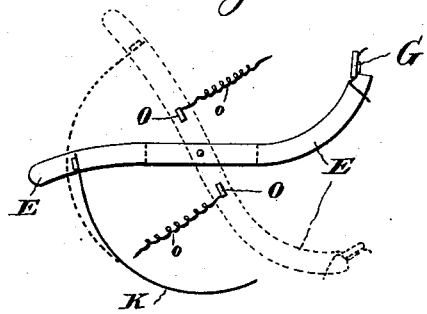

UNITED STATES PATENT OFFICE.

PHILIP L. SYLVESTER, OF SCRANTON, PENNSYLVANIA.

COIN-CONTROLLED DISPLAY APPARATUS.

SPECIFICATION forming part of Letters Patent No. 539,655, dated May 21, 1895.

Application filed November 22, 1894. Serial No. 529,601. (No model.)

*To all whom it may concern:*

Be it known that I, PHILIP L. SYLVESTER, of Scranton, in the county of Lackawanna, and in the State of Pennsylvania, have invented certain new and useful Improvements in Coin-Controlled Display Apparatus; and I do hereby declare that the following is a full, clear, and exact description thereof, reference being had to the accompanying drawings, in which—

Figure 1:
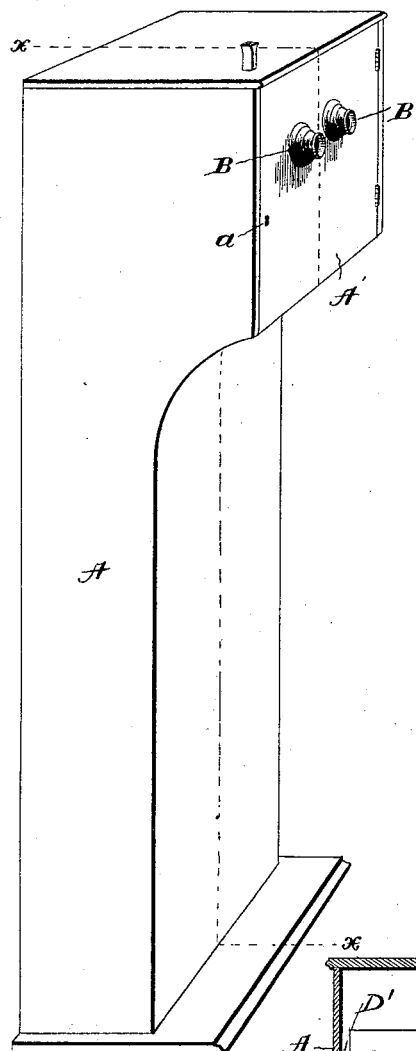
Figure 2:
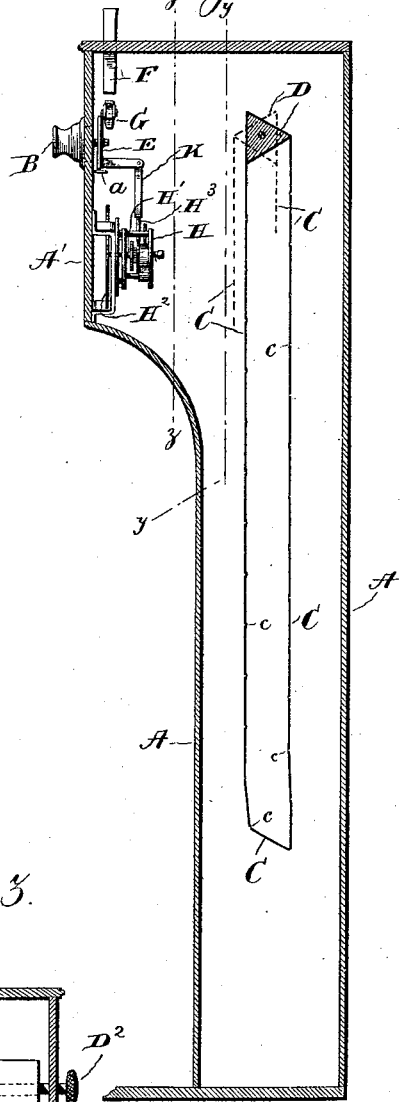
Figure 3:
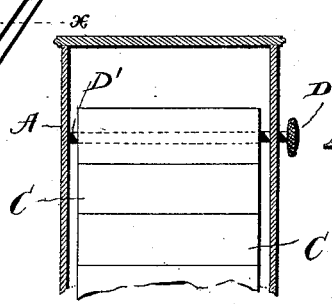

Figure 1 shows a perspective view of my apparatus; Fig. 2, a view of a vertical section of the same on line $xx$ of Fig. 1; Fig. 3, a view of a vertical section on line $yy$ of Fig. 2; Fig. 4, a view of a vertical section on line $zz$ of Fig. 3, looking toward the front side of the apparatus; Fig. 5, a view showing in elevation the mechanism as arranged for controlling the admission of light to the pictures or other devices to be displayed; Fig. 6, a view of a section on line $x'x'$ of Fig. 5; Fig. 7, a view showing in elevation another form of my display-controlling mechanism; Fig. 8, a view of the same in side elevation; Fig. 9, a view in elevation of another form of my display-controlling device; Fig. 10, a detail view showing my invention as applied where the apparatus is to be lighted by an electric light, and Fig. 11 is a detail perspective view of the tilting coin-bucket.

Letters of like name and kind refer to like parts in each of the figures.

The object of my invention has been to provide an improved coin controlled display apparatus; and to this end my invention consists in the apparatus and in the construction, arrangement and combination of the parts thereof, as hereinafter specified.

While I shall show and describe my invention as applied to an apparatus for displaying stereoscopic views, I desire it to be understood, that I do not limit myself to such special application, but contemplate using my display controlling devices in other forms of display apparatus, wherever it is desired to render the pictures or other things to be viewed, visible for a certain length of time upon the payment of the proper coin.

In the drawings, A designates the casing of the apparatus which, as shown, consists of an upright body of wood or other suitable material, having its upper portion extending outward and forward to form an enlarged part, to contain the operating mechanism. For the purpose of allowing access to such mechanism and to the coin receptacle to be provided therein, the front wall of such upper part of the casing can be hinged, as shown, to form a door A' provided with a suitable lock $a$. This door has two sight openings and carries the two eye pieces B B, for such openings, of the ordinary and well known construction used in stereoscopic picture apparatus and provided with the usual lenses, for properly viewing the pictures. While, so far as the sight controlling mechanism is concerned, these pictures can be supported or brought to a point opposite the eye pieces, in any desired way, without involving departure from my invention, I prefer to arrange and support them, as shown, in the drawings, so that, by the turning of a suitable hand piece, a series of them can be brought successively up into viewing position. With this purpose in view, the pictures C C mounted on suitable cards or plates are connected together to form an endless chain, which passes up over a revolving support D, situated within the casing opposite the eye pieces B B. This support consists of a triangular roller on, and turning with shaft D', which is journaled in bearings on the sides of the casing A, and carries on one end, which projects through such casing, a knob $D^2$ by which it can be turned. The flat faces of this roller D are of substantially the same height as the respective cards or plates bearing the pictures. These cards or plates have their contiguous edges connected together by flexible connections $c\ c$, which, while shown as links passing through suitable holes in the connected cards or plates, can be of any other desired form or construction. The purpose of making the roller D triangular, is to make it possible to not only hold a picture in an upright position opposite the eye pieces or sight openings but also to adjust the distance between the picture and eyes, so as to get the proper focus without moving the lenses of the eye pieces.

While, with the roller in position as shown in full lines in Fig. 2, the picture will be at one distance from the eyes, if such roller be turned, as toward the position indicated by dotted lines in the same figure, the picture will, while continuing to hang vertically, be moved nearer the eye pieces. In this way, by slight rotation of the supporting roller in one direction or the other, sufficient change in distance of the picture can be secured to compensate for the differences in the eyes of different users of the apparatus.

In order to control the display of the pictures so that they can be viewed only during a certain predetermined length of time, upon the payment of a certain coin, I provide within the casing coin actuated mechanism in combination with a time movement so arranged that the insertion of a suitable coin in a slot provided therefor will cause the pictures or other things on exhibition to be visible through the sight openings, and will set the time movement going, which after running a certain predetermined time, will automatically cause the sight controlling devices to be moved into position to render the pictures or articles displayed invisible again until the payment of another coin.

In the form of my apparatus shown in Figs. 1, 2, 3, and 4 there is pivoted to the interior of the casing front, a swinging screen E weighted at $e$ so as to stand normally across the sight openings in position to shut off the sight from any picture supported by roller D. This screen, being preferably pivoted on pin $E^2$ fixed to the casing front $A'$ at a point between the two sight openings, can be made of sheet metal or other, thin and opaque material, light enough to be easily swung on its pivot by the weight of the predetermined coin, brought to bear on the screen at a point so as to overbalance the weight $e$. The casing is provided with a coin slot or tube F adapted to admit the proper size of coin and to guide it into the space within the casing at a point close to the part of screen E farthest from the point where such screen is weighted. Hinged to the screen at a point where it will be in position to receive the coin from the slot or tube when the screen is in position to cover the sight openings is the "coin bucket" G consisting of a plate with a flat coin holding part with inturned edges $g$ $g$ to extend part way over the sides of a coin so as to keep the latter down in place on such flat part, an inclined lip $g^2$ to guide the coin from the coin slot or tube to the flat part and between the upturned sides of the plate. At the opposite end of the flat portion from lip $g^2$ is a coin retaining shoulder $g^3$ and beyond that a tongue $g^4$ for a purpose to be described. This "coin bucket" is pivoted upon a pivot rod $G'$ which, being supported on the screen E, extends at right angles to the inner face thereof. The pivot rod is bent to form an arm $g^5$ adapted to limit the swing of the bucket in one direction, while having it free to be tilted in the other. The bucket is so pivoted that, when the screen is in position across the sight opening it will stand upright on its pivot, in position to receive the coin from the tube or slot F. The under side of the bucket then rests against the arm $g^5$ which, as the screen swings to inclose the sight openings, supports the portion of the bucket which is on the opposite side of the pivot rod $G'$.

The pivotal point of the bucket is so arranged with reference to the flat, coin-holding part of the latter that both the weight of the bucket and of a coin held on such flat part, will tend to keep the bucket swung against the stop arm $g^5$.

Fixed on the casing below the screen E is the clock mechanism or time movement H which can be of any desired construction, whether run by weight or a spring. Attached to the minute hand arbor $H'$ of this time movement is the toothed disk $H^2$ so situated that as the screen E is swung to uncover the sight openings of the apparatus the tongue $g^4$ on the "coin bucket" will engage its edge, passing in between two adjacent teeth on the disk. Rotation of the disk in the direction indicated by the arrow in Fig. 4 will then cause the tooth under the tongue to rise so as to tilt the coin bucket to the position indicated in dotted lines which is such that any coin in the bucket will slide off the same and fall into the coin receptacle I, suitably supported within the casing. As soon as the coin is thus discharged the bucket swings back to its normal position against stop arm $g^5$ and the weight $e$, being no longer overbalanced by the coin, returns the screen E to its normal position across the line of sight through the sight openings.

In order that the clock mechanism or time movement may be stopped as the screen returns to position to render the pictures invisible and may be started into motion again as the screen swings to uncover the sight openings, I provide the screen with an arm K adapted to engage a moving part of the clock mechanism so as to hold it from motion while the screen closes the sight openings and give it a starting impulse as the screen swings from its sight intercepting position. In the apparatus shown in the drawings such arm is a curved one, preferably made of spring material, so situated as to engage the periphery of the balance wheel $H^3$ of the time mechanism as the screen E is being swung toward and has nearly reached its normal position in front of the sight openings. The curvature of the arm is such that it not only engages the periphery of the balance wheel before the screen reaches the limit of its swing toward its normal position but remains in such engagement until the screen has been swung back some distance in the opposite direction. With this construction the arm will hold the balance wheel, and consequently the time movement, from motion until the screen is, by the deposit of coin, moved to unclose the sight openings, and then will as it is drawn along over the wheel, by the swing of the screen, give such wheel an impulse to insure the starting of the time mechanism into full operation again. While the screen is held swung out of operative position the arm K is out of contact with the balance wheel so that the same is free to continue moving.

The disk H² as shown has twenty teeth so that it will be turned through the space of one tooth in three minutes. With this construction it will be three minutes after the screen has been swung into open position by a coin, before the longest or highest portion of the disk tooth next below the coin bucket, by engagement with the tongue $g^4$ on the bucket, tilts the latter to dump the coin thereon and allow the screen to return to its normal, closed position. Obviously by varying the number of teeth on the disk or the speed of rotation of the disk carrying arbor, the length of time during which the screen will remain open can be varied at will.

To stop the screen in its proper position with relation to the sight openings when it swings back after being opened, I provide a stop $a$ on the casing in the path of the edge of the screen.

With the construction as shown and above described until a coin is deposited in the receiving slot or tube, the screen will cover the inner sides of the sight openings so that the pictures or other things to be displayed cannot be seen.

When a coin of the proper kind is inserted in the tube or slot it drops into the bucket so as to be retained on the flat portion thereof between the raised sides with the overhanging edges. If a smaller coin is inserted it will not be retained by the inturned edges on the bucket but will fall off the latter within the casing. With the proper coin deposited in the bucket, the screen is, by the coin's weight, swung open so that the tongue $g^4$ on the bucket comes against the edge of the toothed disk in the path of one of the teeth thereon. This swinging of the screen moves the portion of arm K which is in contact with the balance wheel of the clock mechanism or time movement, so that it first turns the wheel a certain distance to give it a starting impulse and then passes beyond and out of contact with the wheel periphery to leave the wheel free to vibrate, as when the time movement is running. The screen then stays open until the tooth on the slowly rotating disk below the tongue $g^4$ engages the latter and raises it so as to tilt the "coin bucket" and dump the coin out of the same. The screen then flies up into position in front of the sight openings and the curved lower portion of arm K comes in contact with and rides over the balance wheel so as to hold it from movement and stop the time mechanism as long as the screen remains closed.

Instead of using the screen for covering the sight openings in the manner above described, I contemplate using it to cover one or more openings for admitting light to the pictures so that they can be seen. The casing is then to be made so that it is necessary for light to be admitted before the pictures can be visible.

In Figs. 5 and 6, I show my apparatus with the screen applied to control the admission of the light. In such construction the whole mechanism remains the same as that already shown and described except that the screen E is pivoted so as to cover a light opening M when it is in its normal position before a coin is deposited. This light opening is preferably in the side of the casing a little to the front of the roller D over which the pictures are passed for display. A light M' in the form of an incandescent electric, or other lamp, can be provided so situated as to shine in upon the picture at the point of display when the screen uncovers the light admitting opening M. In this form of the apparatus as in the other previously described the screen E is the display controlling device since the pictures or other things to be displayed are by its operation rendered visible and invisible according as it is closed or opened.

Instead of using the swinging coin actuated part E as the screen I contemplate where desired employing it as indicated in Fig. 8. In this form of my apparatus a swinging screen N hinged to the casing above the sight openings therein, is connected by rod N' with the swinging piece or plate E, so as to be swung up above the line of vision, through the sight openings, as indicated in dotted lines in Fig. 8, when piece or plate E has been swung as described hereinbefore by the coin deposited in the coin bucket, and to drop down over such openings, as shown in full lines in Figs. 7 and 8, when the coin bucket has been dumped and the piece E returns to its normal position.

In Fig. 9 the screen N, connected with E by a rod N' as before, is shown as a pivoted one adapted to swing in a plane parallel to the inner face of the casing, close to the sight openings in the latter.

In Fig. 10 I show a further modification of my invention in which the swinging part E is used to control the display of the pictures, not by closing the sight openings, or an opening to admit light from outside to the picture or thing to be shown, but by controlling the source of light. In this form of my invention, in which the other operative parts remain the same as already shown and described, the swinging coin actuated piece E instead of being a screen, or connected with one, is made an automatic device for closing and opening an electric circuit for supplying an electric light M', such as that shown in Fig. 6, for rendering the pictures to be displayed, visible. In this modification of my apparatus, there are two contact pieces O, O, with which the wires $o, o$, of the lamp circuit are connected and the piece E provided with the same "coin bucket" G and the same arm K as in the other forms of the apparatus described, has a part made of conducting material arranged so as to come in contact with pieces O, O, and electrically connect the two, so that the current for the light can pass through the circuit as long as the piece E remains swung by the weight of the coin in the "coin bucket" G. With the coin dumped out of the bucket by the action of the toothed disk and time mechanism, the piece E actuated by a suitable weight, as when it is used for a screen, swings to the position shown in full lines in Fig. 10 so that the current is shut off from the light until another coin is deposited in the bucket.

My coin controlled display apparatus shown and described, is simple and cheap in construction and is not liable to get out of order.

The operating devices for controlling the display and making it possible to view the pictures or other devices only for a predetermined time, upon the deposit of a coin, are entirely within the casing, and so arranged that they cannot be subjected to any injuring shock, being set in motion only by the weight of the coin deposited, and in their operation being actuated only by light weights and the spring of the time movement and entirely independent of any power from without the casing.

The only part of the whole apparatus to be actuated by power from without is the roller for moving the pictures successively up into position for the display, and this roller is independent of any of the devices for controlling the display.

Having thus described my invention, what I claim is—

1. In a coin controlled apparatus, in combination with the appliance to be used, a rocking piece controlling the use of said appliance, adapted to be moved in one direction by the weight of a coin, a coin bucket pivotally supported thereon, a device to tilt the bucket to dump the coin therefrom, time mechanism to actuate the bucket tilting device, and means independent of the time mechanism, to actuate the appliance to be used, substantially as and for the purpose specified.

2. In a coin controlled apparatus in combination with a suitable casing, a rocking piece adapted to be moved by the weight of a coin, a coin bucket pivoted on such piece, a device for tilting the bucket to dump the coin therefrom, time mechanism to actuate the bucket tilting device, and an arm on the rocking piece, engaging a portion of the time mechanism, and operating to move the same as the piece is moved by the weight of a coin, substantially as and for the purpose shown.

3. In a coin controlled apparatus, in combination with a suitable casing, a rocking piece adapted to be moved by the weight of a coin, a coin bucket pivoted thereto, a device for tilting the bucket to dump the coin therefrom, time mechanism to actuate such device, an arm on the rocking piece to engage the balance wheel of the time mechanism, to stop the same, and means to give a starting impulse to the balance wheel substantially as and for the purpose described.

4. In a coin controlled apparatus, in combination with a suitable casing, a rocking piece adapted to be moved by the weight of a coin, a coin bucket pivoted thereto, a device for tilting such bucket to dump the coin therefrom, time mechanism for actuating such device, and an arm, actuated by the rocking piece, adapted to engage and hold from movement the escapement of the time mechanism, while the piece is unmoved, and to give a starting impulse to such escapement as the piece is moved by the weight of a coin, substantially as and for the purpose specified.

5. In a coin controlled apparatus in combination with a suitable casing, a rocking piece adapted to be moved in one direction by the weight of a coin, means for holding such piece in its normal position and returning it to the latter, when not actuated by the weight of a coin, a coin bucket, pivoted to such piece, means for tilting the bucket to dump a coin therefrom, time mechanism actuating such device, and a spring arm on the rocking piece engaging the balance wheel, when such piece is in its normal position, substantially as and for the purpose set forth.

6. In a coin controlled apparatus, in combination with a suitable casing, a rocking piece adapted to be moved by the weight of a coin, a coin bucket pivoted thereto, the toothed disk for tilting the bucket to dump a coin therefrom, and time mechanism actuating such disk, substantially as and for the purpose shown.

7. In a coin controlled apparatus, in combination with a suitable casing, the rocking piece adapted to be moved by the weight of a coin, means for moving it back when freed from the weight of the coin, a coin bucket pivoted to the rocking piece, the toothed disk, time mechanism for rotating such disk, and an arm on the rocking piece adapted to engage and stop a portion of the time mechanism, as the rocking piece returns to its normal position after the dumping of a coin from the bucket, substantially as and for the purpose described.

8. In a coin controlled apparatus, in combination with a suitable casing, a rocking piece adapted to be moved by the weight of a coin, means for moving it back when freed from the weight of the coin, a coin bucket pivoted to the rocking piece, a toothed disk for tilting the bucket to dump the coin, time mechanism to actuate the disk, and the spring arm on the rocking piece adapted to engage the balance wheel of the time mechanism, substantially as and for the purpose specified.

9. In a coin controlled display apparatus, in combination with a suitable casing inclosing the matter to be displayed and provided with one or more sight openings, the movable, display controlling piece normally standing in position to render the matter to be displayed invisible, a coin bucket pivoted to such piece, time mechanism, and the bucket tilting device actuated by the time mechanism, substantially as and for the purpose shown.

10. In a coin controlled, display apparatus, in combination with a suitable casing inclosing the matter to be displayed and provided with one or more sight openings, means for rendering such matter visible and invisible from the sight openings, a swinging piece connected therewith, a coin bucket pivoted to such piece, time mechanism, and the bucket tilting device actuated by the latter substantially as and for the purpose set forth.

11. In a coin controlled display apparatus, in combination with a suitable casing inclosing the matter to be displayed and having one or more openings, a swinging screen normally standing across in front of the opening or openings, a pivoted coin bucket connected therewith so that the weight of a coin in the bucket will move the screen, time mechanism, and the bucket tilting device actuated by the latter, substantially as and for the purpose described.

12. In a coin controlled display apparatus, in combination wtth a suitable casing inclosing the matter to be displayed and having the sight openings through which such matter can be viewed, the swinging screen pivoted so as to cover and uncover such openings as it is swung, means for holding it normally in position to cover the openings and to return it to such position, a coin bucket pivoted to the screen, a time mechanism, and the toothed disk for tilting the bucket, actuated by the time mechanism, substantially as and for the purpose shown.

13. In a coin controlled display apparatus, in combination with a suitable casing inclosing the matter to be displayed and having the sight openings through which such matter can be seen, the pivoted screen normally standing across between the matter to be displayed and the sight openings, a pivoted coin bucket connected with the screen so that the weight of a coin in the bucket will swing the screen from its normal position, time mechanism, the bucket tilting device actuated thereby, and an arm connected with the screen to engage and stop the time mechanism while the screen is in its normal position, substantially as and for the purpose specified.

14. In a display apparatus, in combination with a suitable casing provided with one or more sight openings, a roller, for supporting the matter to be displayed, made angular in cross section to vary the focal distance of such matter from the sight openings as it is revolved, and coin-actuated mechanism for rendering the display matter visible through the sight openings substantially as and for the purpose described.

15. In a display apparatus, in combination with a suitable casing provided with one or more openings through which the matter to be displayed can be seen, coin controlled mechanism for rendering such matter visible through the opening, or openings, the triangular roller, and the matter to be displayed connected together so as to form a band or chain passing over the roller, said roller being adapted to vary the focal distance of such matter, from the sight openings, substantially as and for the purpose set forth.

In testimony that I claim the foregoing I have hereunto set my hand this 1st day of November, 1894.

PHILIP L. SYLVESTER.

Witnesses:
W. S. DIEHL,
W. J. KANN.